June 4, 1935.   M. B. SALISBURY   2,003,957

JINGLE BALL

Filed Nov. 9, 1934

Inventor
Moses B. Salisbury
By *[signature]* Attys.

Patented June 4, 1935

2,003,957

UNITED STATES PATENT OFFICE 2,003,957

JINGLE BALL

Moses B. Salisbury, Chicago, Ill.

Application November 9, 1934, Serial No. 752,236

3 Claims. (Cl. 46—46)

My invention relates to balls which are adapted to produce sound when rotated, the principal purpose of the invention being to provide a device of this character for use as a toy or plaything, primarily for dogs, which toy will be able to withstand the rough usage to which the dog subjects it without affecting its sound producing qualities.

The invention contemplates the provision of a ball made of a semihard rubber, that is rubber soft enough to yield under pressure, but of such hardness and thickness as to prevent the permanent distortion of the surface thereof and to prevent tearing or biting through the ball.

It is further a purpose of this invention to provide a ball of this character with a novel means whereby a round bell placed within the ball may be caused to jingle upon rotation or bouncing of the ball with sufficient loudness to be readily noticeable at a short distance.

It is a further purpose of the invention to provide a novel means for inserting and retaining the sound producing element or bell within the interior of the ball.

I will describe the preferred form of the invention by reference to the accompanying drawing wherein—

Figure 1:
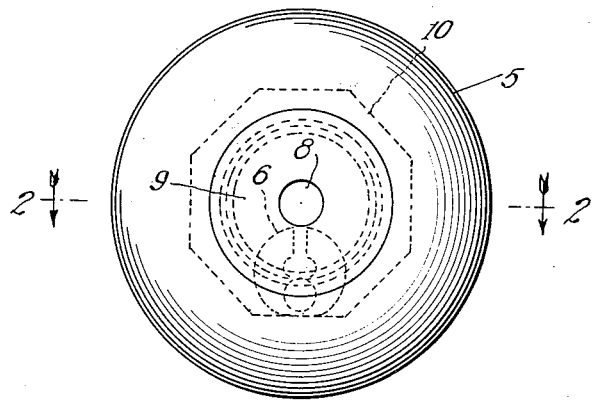
Figure 2:
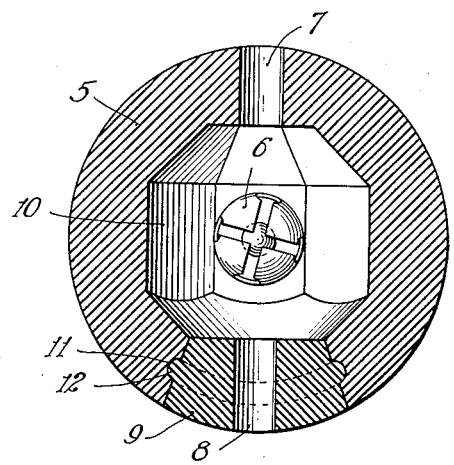

Fig. 1 is a plan view of the ball, the interior and the bell being shown dotted; and Fig. 2 is a sectional view taken on the line 2—2 of Fig. 1.

Referring now in detail to the drawing, the essential elements of this ball are the body portion or ball part 5, the sound producing element or bell 6, the openings 7 and 8 for emitting sound, the plug 9 for the insertion of the bell 6, and the irregular interior surface 10 of the ball portion 5.

I am aware that it has heretofore been proposed to insert bells and sound producing devices inside rubber balls and other kinds of balls, but such devices have proven unsatisfactory for the purpose of this ball because of their inability to hold their shape and avoid being torn while still retaining the sound producing quality.

I have found that, by making a ball 5 with a wall so thick as to prevent pressure on the ball from inverting the curvature of any particular section of the ball when the air is pushed out from the interior and pressure is applied at a particular spot on the outside, the wall is capable of withstanding the rough chewing of a dog and further does not offer any collapsed portion which the dog may bite into and thus start the ball to tearing.

Naturally the material of which the ball is made must not be the soft sponge rubber as that cannot withstand the treatment. It is a relatively hard rubber for two purposes: one, to make the ball capable of withstanding the chewing, and the other is to provide sufficient hardness in the hollow interior that the polygonal or rough surface 10 will actually repel the bell 6 to give the jingling sound desired. The interior surface of the ball is made up of a plurality of faces set at an angle to each other in such fashion that, no matter which way the ball rolls or bounds, its result is to give a tumbling motion to the bell 6.

Of course, the bell 6 may be inserted within the hollow in many ways, but I have found considerable difficulty in establishing means whereby the bell may be inserted and the entire exterior of the ball still retained in its full strength. In the present form of the invention, I prefer to provide a plug 9 which is sufficiently large to close an opening in the ball body through which the bell 6 may be inserted. I, however, do not limit myself to this method of insertion.

The entire ball body 5 is first molded with the opening for the plug 9 somewhat smaller than the plug and with the groove 11 provided around the opening to receive a corresponding locking ring 12 formed on the plug 9. The plug 9 may be and preferably is of the semihard rubber as is the ball 5. The two surfaces, that is the surface around the opening in the ball and the plug surface to engage it, are covered with rubber cement in a well-known fashion, and then the plug 9 is driven in under pressure until the ring 12 seats in the groove 11. This insures hardening of the cement under pressure and furthermore maintains a pressure joint always between the plug and the wall regardless of what happens to the cement so that the dog will not be tearing the plug out of the ball.

From the above description, it is believed that the construction and advantages of this device will be clear to those skilled in this art. It is also believed to be obvious that various minor modifications may be made from the exact details shown and described without departing from the scope of the invention as defined in the claims.

Having thus described one specific form of my invention, what I claim as new and desire to secure by Letters Patent is:

1. A sound producing ball comprising a hollow body portion of semihard rubber, the interior surface of which is irregularly formed, a sound producing device within the ball actuated by movement of the device over the irregular surface, said ball having a sound emitting opening through the wall thereof, the wall of the ball being sufficiently thick to prevent pressure on the ball at any particular spot from inverting the curvature of the wall.

2. A play ball adapted to produce sound when it is in motion comprised of a hollow body of semihard rubber of such thickness as to prevent the permanent distortion of the shape thereof, a bell within the ball, the bell and the hollow interior of the ball having cooperating surfaces adapted to give the bell an irregular motion upon rotation of the ball.

3. A play ball of the character described comprising a hollow body of semihard rubber of such hardness and thickness as to prevent the permanent distortion of the surface thereof, a bell within the ball, the inner surface of the ball being composed of a plurality of faces angularly disposed with respect to each other, said ball body having an opening therein large enough to insert the bell, and a plug in said opening sealed therein under pressure, said ball being provided with openings for the emission of sound.

MOSES B. SALISBURY.